US012145448B2

(12) United States Patent
Varela

(10) Patent No.: US 12,145,448 B2
(45) Date of Patent: Nov. 19, 2024

(54) DRIVE AXLE SYSTEM

(71) Applicant: ArvinMeritor Technology, LLC, Troy, MI (US)

(72) Inventor: Tomaz Varela, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 40 days.

(21) Appl. No.: 18/307,542

(22) Filed: Apr. 26, 2023

(65) Prior Publication Data
US 2023/0256809 A1     Aug. 17, 2023

Related U.S. Application Data

(63) Continuation of application No. 17/347,925, filed on Jun. 15, 2021, now Pat. No. 11,685,253.

(51) Int. Cl.
*B60K 7/00* (2006.01)

(52) U.S. Cl.
CPC .... *B60K 7/0007* (2013.01); *B60K 2007/0038* (2013.01); *B60K 2007/0069* (2013.01)

(58) Field of Classification Search
CPC .......... B60K 7/0007; B60K 2007/0038; B60K 2007/0069
See application file for complete search history.

(56) References Cited

U.S. PATENT DOCUMENTS

| | | | | |
|---|---|---|---|---|
| 3,862,667 A * | 1/1975 | Wolansky | ............. | B60K 17/30 180/254 |
| 6,843,746 B2 * | 1/2005 | Hayes | .................... | B60K 17/16 184/6.12 |
| 7,364,528 B2 * | 4/2008 | Brill | ........................ | B60B 11/02 180/905 |
| 7,398,846 B2 * | 7/2008 | Young | ..................... | B60G 3/18 310/67 R |
| 8,794,280 B2 * | 8/2014 | Flory | ................ | B60C 23/00354 152/415 |
| 9,278,587 B2 * | 3/2016 | Honig | ................... | B60C 23/002 |
| 9,283,818 B2 * | 3/2016 | Keeney | ............ | B60C 23/00318 |
| 9,315,077 B2 * | 4/2016 | Flory | ................ | B60C 23/00318 |
| 9,333,813 B2 * | 5/2016 | Tiziani | ............. | B60C 23/00363 |
| 9,428,016 B2 * | 8/2016 | Keeney | ................. | B60C 23/127 |
| 9,452,644 B2 * | 9/2016 | Keeney | ............ | B60C 23/00345 |
| 9,452,645 B2 * | 9/2016 | Polubinski | ........ | B60C 23/00327 |
| 9,481,213 B2 * | 11/2016 | Keeney | ............ | B60C 23/00345 |
| 9,517,663 B2 * | 12/2016 | Lewandowski | ... | B60C 23/00363 |

(Continued)

FOREIGN PATENT DOCUMENTS

CN      203427602 U    2/2014
DE   102017005462 A1   11/2017
(Continued)

OTHER PUBLICATIONS

Extended European search report dated Nov. 17, 2022 for related European patent application No. 22178239.4, 8 pages.

*Primary Examiner* — Erez Gurari
(74) *Attorney, Agent, or Firm* — Brooks Kushman PC

(57) ABSTRACT

A drive axle system that includes first and second wheel end assemblies, a support structure, and an electric motor. A support structure supports the first and second wheel end assemblies and the electric motor. The electric motor has a rotor that is rotatable about a rotor axis. The rotor axis is disposed below a wheel axis.

13 Claims, 2 Drawing Sheets

(56) References Cited

U.S. PATENT DOCUMENTS

| | | | |
|---|---|---|---|
| 9,539,865 B2* | 1/2017 | Lakin | B60C 23/00345 |
| 9,597,931 B2* | 3/2017 | Dean | B60C 23/00372 |
| 9,713,854 B2* | 7/2017 | Zhai | B23K 20/129 |
| 9,809,065 B2 | 11/2017 | Polubinski et al. | |
| 9,815,340 B2* | 11/2017 | Trostle | B60C 23/00354 |
| 9,919,569 B2 | 3/2018 | Lewandowski et al. | |
| 10,035,384 B2 | 7/2018 | Keeney et al. | |
| 10,052,923 B2* | 8/2018 | Power | B60C 23/127 |
| 10,391,824 B2* | 8/2019 | Trostle | B60C 23/00318 |
| 10,513,146 B2* | 12/2019 | Eschenburg | B60K 17/02 |
| 10,801,556 B2* | 10/2020 | Eschenburg | B60K 17/02 |
| 11,002,352 B2* | 5/2021 | Ghatti | F16H 57/021 |
| 11,273,700 B2* | 3/2022 | Garcia | F16C 19/383 |
| 11,618,281 B2* | 4/2023 | Keeney | B60B 35/122 |
| | | | 475/5 |
| 11,858,342 B2* | 1/2024 | Auer | B60K 7/0007 |
| 2004/0189235 A1* | 9/2004 | Kramer | B60L 50/00 |
| | | | 318/685 |
| 2004/0195012 A1* | 10/2004 | Song | B60K 7/0007 |
| | | | 180/6.5 |
| 2005/0082782 A1* | 4/2005 | Jolley | F16L 27/093 |
| | | | 280/124.109 |
| 2006/0158024 A1* | 7/2006 | Wendl | B60K 7/0007 |
| | | | 301/137 |
| 2008/0179116 A1* | 7/2008 | Ikenoya | B60K 17/356 |
| | | | 180/63 |
| 2008/0179128 A1* | 7/2008 | Iwaki | B60K 17/356 |
| | | | 180/242 |
| 2012/0103708 A1* | 5/2012 | Hennings | B60K 7/0007 |
| | | | 180/65.6 |
| 2013/0240273 A1* | 9/2013 | Langer | H01M 50/249 |
| | | | 180/55 |
| 2013/0240282 A1* | 9/2013 | Bindl | B62D 9/04 |
| | | | 180/255 |
| 2014/0041481 A1* | 2/2014 | Pinotti | B21D 53/90 |
| | | | 228/164 |
| 2014/0087906 A1* | 3/2014 | Keeney | B60L 15/2009 |
| | | | 475/150 |
| 2014/0245862 A1* | 9/2014 | Lang | B60K 7/0007 |
| | | | 74/665 A |
| 2015/0096655 A1* | 4/2015 | Koulinitch | B60C 23/00318 |
| | | | 152/416 |
| 2018/0296906 A1* | 10/2018 | Quick | B60B 27/0015 |
| 2019/0039409 A1 | 2/2019 | Eschenburg et al. | |
| 2019/0054816 A1 | 2/2019 | Garcia et al. | |
| 2019/0331173 A1 | 10/2019 | Eschenburg et al. | |
| 2020/0164737 A1* | 5/2020 | Kozlenok | B62D 63/025 |
| 2020/0180426 A1* | 6/2020 | Chopra | B60K 17/046 |
| 2020/0276895 A1* | 9/2020 | Mepham | B60K 17/046 |
| 2021/0245599 A1* | 8/2021 | Mepham | B60B 35/16 |
| 2021/0379983 A1* | 12/2021 | Baillie | B60K 11/02 |
| 2022/0185096 A1* | 6/2022 | Ameye | B62D 7/06 |
| 2022/0242223 A1* | 8/2022 | Yu | B60K 7/0007 |
| 2022/0320946 A1* | 10/2022 | Varela | B60K 7/0007 |
| 2022/0396140 A1* | 12/2022 | Varela | B60K 7/0007 |

FOREIGN PATENT DOCUMENTS

| | | |
|---|---|---|
| GB | 2399323 A | 9/2004 |
| WO | 2019217861 A1 | 11/2019 |
| WO | 2019233329 A1 | 12/2019 |

\* cited by examiner

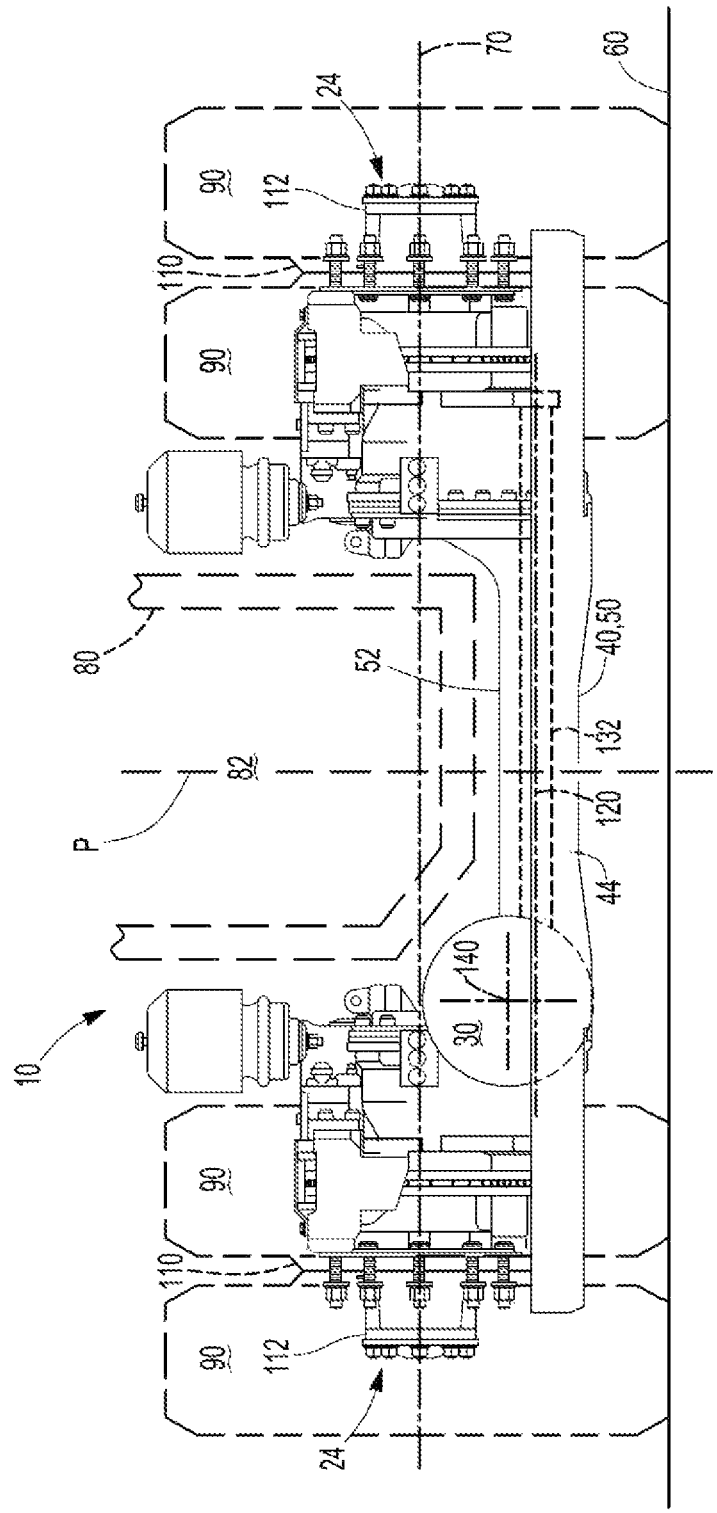

DRIVE AXLE SYSTEM

CROSS-REFERENCE TO RELATED APPLICATIONS

This application is a continuation of U.S. application Ser. No. 17/347,925, filed Jun. 15, 2021, the disclosure of which is hereby incorporated in its entirety by reference herein.

TECHNICAL FIELD

This disclosure relates to a drive axle system that may have a support structure that may support first and second wheel end assemblies and an electric motor that is operatively connected to the first and second wheel end assemblies.

BACKGROUND

An axle assembly having an electric motor module is disclosed in U.S. Patent Publication No. 2019/0054816.

SUMMARY

In at least one embodiment a drive axle system is provided. The drive axle system may include a first wheel end assembly, a second wheel end assembly, a support structure, and an electric motor. The first and second wheel end assemblies may each have a wheel hub that may be rotatable about a wheel axis. The support structure may support the first and second wheel end assemblies. The electric motor may be supported by the support structure and may be operatively connected to the first and second wheel end assemblies. The electric motor may include a rotor that is rotatable about a rotor axis. The rotor axis may be disposed below the wheel axis and may be disposed substantially perpendicular to the rotor axis.

In at least one embodiment a drive axle system is provided. The drive axle system may include a first wheel end assembly, a second wheel end assembly, a support structure, and an electric motor. The first and second wheel end assemblies may each have a wheel hub that may be rotatable about a wheel axis. The support structure may include a main support, a first rear arm, a second rear arm, and a suspension beam. The main support may support the first and second wheel end assemblies. The first rear arm may extend from the main support in a rearward direction. The second rear arm may be spaced apart from the first rear arm and may extend in the rearward direction from the main support. The suspension beam may be mounted to the first rear arm and the second rear arm. The electric motor may be supported by the support structure and may be operatively connected to the first and second wheel end assemblies. The electric motor may be positioned laterally between the first wheel end assembly and the first rear arm.

BRIEF DESCRIPTION OF THE DRAWINGS

FIG. 2 is a rear side view of a portion of the drive axle system of FIG. 1.

DETAILED DESCRIPTION

Figure 1:
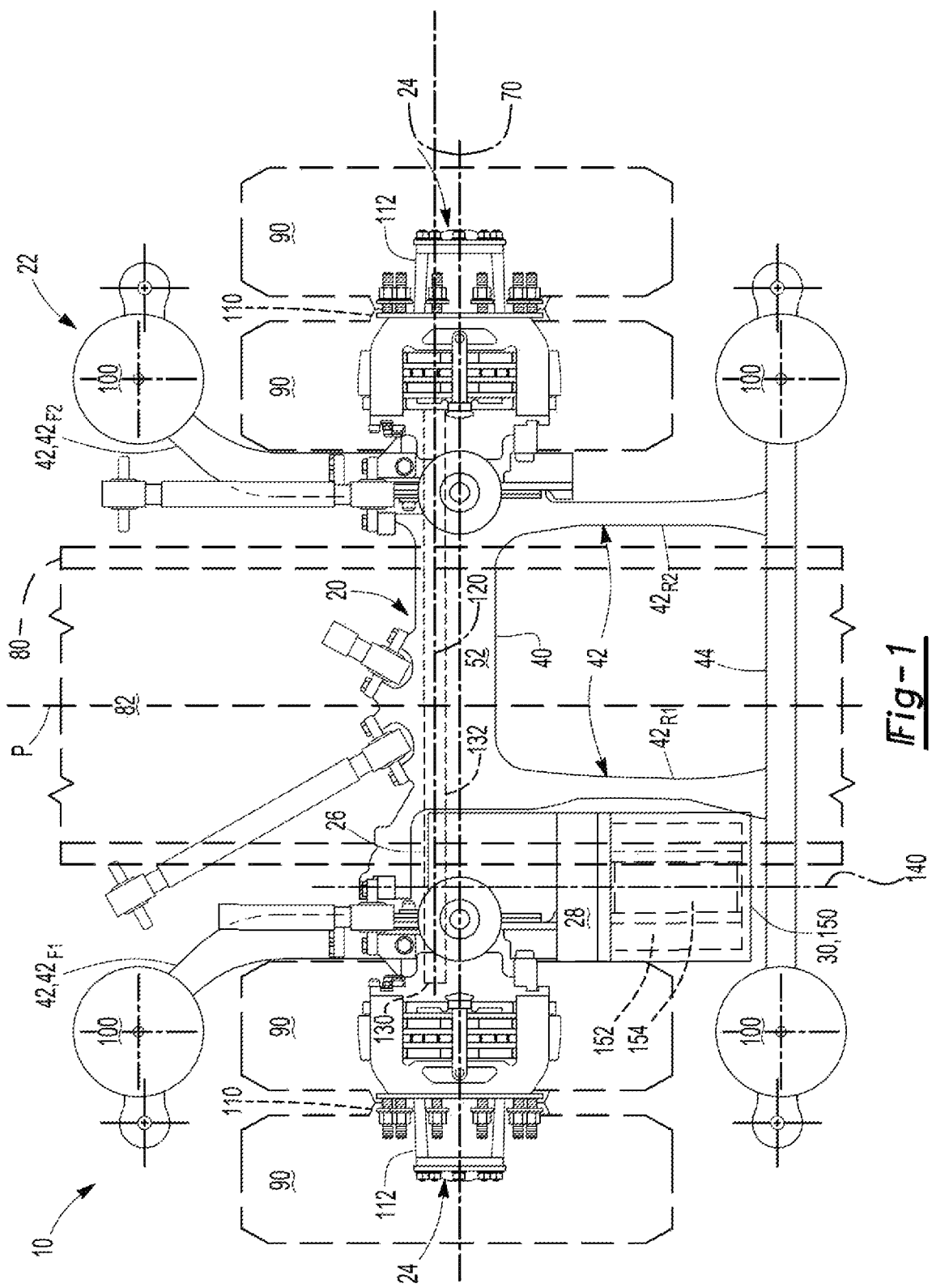
FIG. 1 is a plan view of an example of a drive axle system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The words "longitudinal" and "longitudinally" are used herein to designate a direction that extends between the front end and the rear end of the vehicle, or in a direction that extends parallel to a center plane P of the vehicle from the perspective shown in FIG. 1. A frontward direction extends longitudinally toward the front of the vehicle or toward top of FIG. 1 from the perspective shown. A rearward direction is disposed opposite the frontward direction. As such, a rearward direction extends longitudinally toward the rear of the vehicle or toward the bottom of FIG. 1 the perspective shown.

The words "lateral" and "laterally" are used to designate a direction that extends between the left and right sides of the vehicle, or that is perpendicular to longitudinal and the center plane P of the vehicle from the perspective shown in FIGS. 1 and 2. An inboard direction extends laterally toward the center plane P. An outboard direction extends laterally away from the center plane. A component may be inboard of another component when it is positioned closer to the center plane P than the other component. A component may be outboard of another component when it is positioned further from the center plane P than the other component.

The term "substantially parallel" means the same as or very close to parallel and includes features or axes that are within ±2° of being parallel each other. The term "substantially perpendicular" is used to designate features or axes that are the same as or very close to perpendicular and includes features that are within ±2° of being perpendicular each other.

Referring to FIG. 1, an example of a drive axle system 10 is shown. The drive axle system 10 may be provided with a vehicle like a bus, car, truck, or the like. In at least one configuration, the drive axle system 10 may include a support structure 20, a suspension system 22, one or more wheel end assemblies 24, a differential assembly 26, a transmission 28, and an electric motor 30.

The support structure 20 may be configured to support components of the drive axle system 10, such as the wheel end assemblies 24, differential assembly 26, transmission 28, electric motor 30, or combinations thereof. In addition, the support structure 20 may operatively connect the wheel end assemblies 24 to the suspension system 22. In at least one configuration, the support structure 20 may include a main support 40, a plurality of arms 42, and a suspension beam 44.

The main support 40 may support multiple wheel end assemblies 24. For example, the main support 40 may primarily extend in a lateral direction and may be approximately bisected by the center plane P. A wheel end assembly 24 may be disposed proximate each lateral end of the main support 40 (i.e., at opposite ends of the main support 40). In at least one configuration, the main support 40 may extend below each wheel end assembly 24 may have a bottom side 50 and a top side 52.

Referring to FIG. 2, the bottom side 50 may face downward or toward a support surface 60 upon which a vehicle having the drive axle system 10 may be disposed. The bottom side 50 may be hidden behind the suspension beam 44 from the perspective shown.

Referring to FIGS. 1 and 2, the top side 52 may be disposed opposite the bottom side 50. The top side 52 may generally between the wheel end assemblies 24 and may be positioned below a wheel axis of rotation or wheel axis 70. Such a configuration may provide a gap between the wheel end assemblies 24 through which a portion of the vehicle body structure 80 of the vehicle may extend. More specifically, a portion of the vehicle body structure 80 that defines a floor or aisle 82 of the vehicle may be located between the wheel end assemblies 24, thereby positioning floor or aisle 82 closer to the ground or road upon which the vehicle is disposed. The floor or aisle 82 may extend in a longitudinal direction through the gap and between the wheel end assemblies 24 such that the bottom of the floor or aisle 82 may be positioned below the top of the wheel end assemblies 24 and below the wheel axis 70. In a vehicle such as a bus, the aisle 82 may be a passenger aisle. For clarity, the vehicle body structure 80 and the aisle 82 are shown in phantom to more clearly show other components of the drive axle system 10.

Referring to FIG. 2, the vehicle body structure 80 that defines the floor or aisle 82 may extend over and may be spaced apart from the top side 52 to accommodate vehicle body roll or leaning of the vehicle body structure 80 in a lateral direction, such as may occur during cornering of the vehicle.

Referring to FIG. 1, one or more arms 42 may extend from the main support 40. In the configuration shown, four arms are depicted, with two arms extending forward or frontward from the main support 40 and two arms extending rearward from the main support 40. The forward extending arms may be referred to as a first front arm $42_{F1}$ and a second front arm $42_{F2}$. The rearward extending arms may be referred to as a first rear arm $42_{R1}$, and the second rear arm $42_{R2}$.

The first front arm $42_{F1}$ may extend from the main support 40 in a frontward direction. The first front arm $42_{F1}$ may be laterally positioned closer to the wheel end assembly 24 that is disposed to the left of the center plane P from the perspective shown. For convenience in reference, this wheel end assembly may be referred to as a first wheel end assembly 24.

The second front arm $42_{F2}$ may be spaced apart from the first front arm $42_{F1}$. The second front arm $42_{F2}$ may extend from the main support 40 in a frontward direction. The second front arm $42_{F2}$ may be laterally positioned closer to the wheel end assembly 24 that is disposed to the right of the center plane P from the perspective shown. For convenience in reference, this wheel end assembly may be referred to as a second wheel end assembly 24.

The first rear arm $42_{R1}$ may extend from the main support 40 in a rearward direction. The first rear arm $42_{R1}$ may be laterally positioned closer to the center plane P than the first front arm $42_{F1}$. As such, the first front arm $42_{F1}$ may be laterally positioned closer to the first wheel end assembly 24 than the first rear arm $42_{R1}$ is positioned to the first wheel end assembly 24.

The second rear arm $42_{R2}$ may be spaced apart from the first rear arm $42_{R1}$. The second rear arm $42_{R2}$ may extend from the main support 40 in a rearward direction. The second rear arm $42_{R2}$ may be laterally positioned closer to the second wheel end assembly 24 than the second rear arm $42_{R2}$ is positioned to the first wheel end assembly 24. The second rear arm $42_{R2}$ may be laterally positioned closer to the center plane P than the second front arm $42_{F2}$. As such, the second front arm $42_{F2}$ may be laterally positioned closer to the second wheel end assembly 24 than the second rear arm $42_{R2}$ is positioned to the second wheel end assembly 24.

The suspension beam 44 may be fixedly mounted to the first rear arm $42_{R1}$ and the second rear arm $42_{R2}$. More specifically, the suspension beam 44 may be mounted to an end of the first rear arm $42_{R1}$ that may be disposed opposite the main support 40 and an end of the second rear arm $42_{R2}$ that may be disposed opposite the main support 40. The suspension beam 44 may extend laterally and may be disposed substantially parallel to the wheel axis 70. In addition, the suspension beam 44 may be disposed rearward of the electric motor 30 and one or more tires 90 that may be mounted to the first and second wheel end assemblies 24.

The suspension system 22 may connect the support structure 20 with a frame or chassis of the vehicle. In addition, the suspension system 22 may dampen vibrations associated with vehicle travel, provide a desired level of ride quality, help control vehicle ride height, or combinations thereof. The suspension system 22 may have any suitable configuration. For instance, the suspension system 22 may be an independent suspension system that may allow wheels to independently move up and down with respect to each other or without influence from another wheel. Alternatively, the suspension system 22 may not be an independent suspension system. The suspension system 22 may include one or more dampeners 100, such as air springs, shock absorbers, or combinations thereof. In the configuration shown, the dampeners 100 are depicted as air springs with one dampener 100 disposed proximate a distal end of the first front arm $42_{F1}$ and frontward of a tire 90 that may be mounted to the first wheel end assembly 24, a second dampener 100 disposed proximate a distal end of the second front arm $42_{F2}$ and frontward of a tire 90 that may be mounted to the second wheel end assembly 24, and two dampeners 100 disposed on the suspension beam 44 rearward of a corresponding tire 90. A top side of each air spring may be disposed underneath a chassis of the vehicle and may support the chassis. The dampeners 100 are omitted in FIG. 2 to more clearly show other components.

Referring to FIGS. 1 and 2, a wheel end assembly 24 may be disposed at an outboard end of the main support 40 that may face away from the floor or aisle 82. Each wheel end assembly 24 may facilitate mounting of a wheel 110 upon which at least one tire 90 may be disposed. For instance, each wheel end assembly 24 may include a wheel hub 112 that may be rotatable about the wheel axis 70. The wheel hub 112 may include a plurality of lug bolts that may extend through corresponding holes of a wheel 110 in a manner known by those skilled in the art. As such, the tire 90, wheel 110, and wheel hub 112 may be rotatable together about the wheel axis 70. Optionally, reduction gearing may be provided with the wheel end assembly 24. For instance, a reduction gearset having helical gears, bevel gears or a planetary gear set may be provided with the wheel end assembly 24 to provide gear reduction between the differential assembly 26 and the wheel hub 112. The wheel end assembly 24 may be operatively connected to the differential assembly 26 via a shaft. The wheel end assembly 24 may also include a friction brake that may facilitate braking of the vehicle.

Referring to FIG. 1, the differential assembly 26 may transmit torque between the electric motor 30 and the wheel hubs 112. The differential assembly 26 may be disposed closer to the first wheel end assembly 24 than to the second wheel end assembly 24.

The differential assembly 26 may be operatively connected to the wheel hubs 112 and may permit the wheel hubs 112 to rotate at different rotational speeds in a manner known by those skilled in the art. For instance, the differential assembly 26 may have a ring gear that may have teeth the mate or mesh with the teeth of a gear portion of a drive pinion that may be operatively connected to the electric motor 30. Accordingly, the differential assembly 26 may receive torque from the drive pinion via the ring gear and transmit torque to the wheel hubs 112.

Referring to FIG. 1, the differential assembly 26 may be rotatable about an axis 120, which may also be referred to as a differential axis or an axle shaft axis. As is best shown in FIG. 2, the axis 120 may be disposed below or closer to the support surface 60 than the wheel axis 70. As such, the axis 120 may be disposed below the wheel axis 70. In addition, the axis 120 may be disposed parallel or substantially parallel to the wheel axis 70.

The differential assembly 26 may transmit torque to the wheel hubs 112 via corresponding axle shafts. For instance, the differential assembly 26 may be operatively connected to a first axle shaft 130 and a second axle shaft 132 that may be rotatable about the axis 120.

Referring to FIG. 1, the first axle shaft 130 may be operatively connected to the wheel hub 112 of the first wheel end assembly 24 in any suitable manner, such as with meshing gears that allow the wheel axis 70 to be offset from the axis 120. For instance, an upper gear may be disposed on the shaft that extends from the wheel hub 112 of the first wheel end assembly 24. This upper gear may mesh with a corresponding lower gear that is mounted to the first axle shaft 130.

The second axle shaft 132 may be operatively connected to the wheel hub 112 of the second wheel end assembly 24 in any suitable manner. For instance, another upper gear may be disposed on the shaft that extends from the wheel hub 112 of the second wheel end assembly 24 and may mesh with a corresponding lower gear that is mounted to the second axle shaft 132. In at least one configuration, the second axle shaft 132 may extend through the support structure 20. For instance, the second axle shaft 132 may be disposed inside the main support 40.

Referring to FIG. 1, the transmission 28 may operatively connect the differential assembly 26 to the electric motor 30. The transmission 28 may be positioned along a rotor axis 140 rearward of the wheel axis 70, rearward of the axle shaft axis 120, or both. The transmission 28 may be laterally positioned between the first wheel end assembly 24 and a portion of the vehicle body structure that defines the aisle 82. The transmission 28 may include a plurality of gears that may transmit torque between the electric motor 30 and the differential assembly 26. The transmission 28 may be of any suitable type and may provide a single speed or multiple speed reduction. For instance, the transmission 28 may include a planetary gear set that may provide gear reduction or speed reduction between the electric motor 30 and the differential assembly 26. In at least one configuration, the transmission 28 may be operatively connected to the differential assembly 26 with a drive pinion that may mesh with a ring gear of the differential assembly 26 as previously discussed. In at least one configuration, the drive pinion may be rotatable about the rotor axis 140.

Referring to FIGS. 1 and 2, the electric motor 30 may be operatively connected to the wheel end assemblies 24, such as via the differential assembly 26, the transmission 28, and the first and second axle shafts 130, 132. The electric motor 30 may provide torque to the wheel end assemblies 24 to help propel the vehicle. In addition, the electric motor 30 may receive torque from the wheel end assembly 24 to help recover energy or provide regenerative braking. The electric motor 30 may be electrically connected to an electrical power source, such as a battery, capacitor, or the like. An inverter may electrically connect the electric motor 30 and the electrical power source in a manner known by those skilled in the art.

The electric motor 30 may be positioned in a manner to help reduce or avoid intrusion into the aisle 82. As is best shown in FIG. 2, the electric motor 30 may be disposed above the bottom side 50 of the main support 40 to help prevent impact with objects underneath the vehicle. The electric motor 30 may also be positioned partially or completely below the wheel axis 70 to help increase the lateral width of the aisle 82. In addition, the electric motor 30 may have a diameter that may be sufficiently small to stay within the profile of a differential carrier that may support the differential assembly 26. As is best shown in FIG. 1, the electric motor 30 may be disposed closer to the first wheel end assembly 24 than to the second wheel end assembly 24 to help position the electric motor 30 away from the center plane P and the aisle 82. For instance, the electric motor 30 may be disposed inboard of the tire 90 of the first wheel end assembly 24 and outboard of a portion of the vehicle body structure 80 that defines the aisle 82. In addition, the electric motor 30 may be positioned laterally between the first wheel end assembly 24 and the first rear arm $42_{R1}$. The electric motor 30 may be partially or completely disposed rearward with respect to the wheel axis 70, axle shaft axis 120, or both. For instance, the electric motor 30 may be positioned rearward of the main support 40 and forward of the suspension beam 44.

The electric motor 30 may have any suitable configuration. In at least one configuration and as is best shown with reference to FIG. 1, the electric motor 30 may include a housing 150, a stator 152, a rotor 154.

The housing 150 may receive components of the electric motor 30, such as the stator 152 and the rotor 154. In addition, the housing 150 may facilitate mounting of the electric motor 30 to the transmission 28. It is also contemplated that the housing 150 may be supported by a portion of the support structure 20 like the suspension beam 44.

The stator 152 may be received inside the housing 150 and may be fixedly positioned with respect to the housing 150. The stator 152 may extend around the rotor axis 140 and may not rotate about the rotor axis 140. The stator 152 may include stator windings that may be electrically connected to the electrical power source. Optionally, a coolant jacket may extend around and may encircle the stator 152. The stator 152 may encircle the rotor 154.

The rotor 154 may be received inside the stator 152. In addition, the rotor 154 may extend around and may be rotatable about the rotor axis 140. The rotor 154 may be rotatable about the rotor axis 140 with respect to the stator 152. The rotor 154 may be spaced apart from the stator 152 but may be disposed in close proximity to the stator 152. The rotor 154 may include magnets or ferromagnetic material that may facilitate the generation of electric al current or may be induction-based. The rotor 154 may be operatively connected to the transmission 28, such as via a rotor shaft that may be rotatable about the rotor axis 140.

Referring to FIG. 2, the rotor axis 140 may be disposed below the wheel axis 70 or closer to the support surface 60 than the wheel axis 70. In addition the rotor axis 140 may be disposed substantially perpendicular to the wheel axis 70 as is best shown in FIG. 1. The rotor axis 140 may be disposed above the axis 120 in one or more configurations. As is best shown in FIG. 1, the rotor axis 140 may be laterally positioned between the first wheel end assembly 24 and a portion of the vehicle body structure that defines the aisle 82.

In addition, the rotor axis 140 may be laterally positioned between the first wheel end assembly 24 and the first rear arm $42_{R1}$. For instance, the rotor axis 140 may be laterally positioned between the first front arm $42_{F1}$ and the first rear arm $42_{R1}$.

A drive axle system as described above may help position an electric motor in a manner that reduces intrusion of an electric motor into an aisle of a vehicle, which may facilitate movement of passengers or cargo along the aisle. In addition, a drive axle system as described above may allow a single electric motor to be connected to multiple wheel end assemblies, which may reduce weight and associated costs as compared to a configuration in which different electric motors are connected to each wheel end assembly. Moreover, a single electric motor configuration may allow a single transmission to be provided between the electric motor and the wheel end assemblies, thereby helping reduce cost, weight, and package space.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle system comprising:
   a first wheel end assembly and a second wheel end assembly that each have a wheel hub that is rotatable about a wheel axis;
   a support structure that includes:
      a main support that supports the first and second wheel end assemblies;
      a first rear arm that extends from the main support in a rearward direction;
      a second rear arm that is spaced apart from the first rear arm and extends in the rearward direction from the main support; and
      a suspension beam that is mounted to the first rear arm and the second rear arm and is spaced apart from the main support; and
   an electric motor that is supported by the support structure and is operatively connected to the first and second wheel end assemblies, wherein the electric motor includes a rotor that is rotatable about a rotor axis, wherein the rotor axis is disposed below the wheel axis and above the first rear arm.

2. The drive axle system of claim 1 wherein the electric motor is positioned longitudinally between the main support and the suspension beam.

3. The drive axle system of claim 1 wherein the suspension beam is fixedly mounted to an end of the first rear arm and an end of the second rear arm.

4. The drive axle system of claim 1 wherein the electric motor is spaced apart from and does not contact the suspension beam.

5. The drive axle system of claim 1 wherein the rotor axis is disposed below the wheel axis and is disposed substantially perpendicular to the wheel axis.

6. The drive axle system of claim 5 wherein the rotor axis is laterally positioned between the first wheel end assembly and the first rear arm.

7. The drive axle system of claim 5 wherein the rotor axis is laterally positioned between the first wheel end assembly and a portion of a vehicle body structure that defines an aisle.

8. The drive axle system of claim 5 wherein the support structure further comprises a first front arm that extends from the main support in a frontward direction and that is laterally positioned closer to the first wheel end assembly than the first rear arm is positioned to the first wheel end assembly.

9. The drive axle system of claim 8 wherein the rotor axis is laterally positioned between the first front arm and the first rear arm.

10. The drive axle system of claim 1 further comprising a transmission that operatively connects the electric motor to a differential assembly, wherein the transmission is positioned along the rotor axis rearward of the wheel axis.

11. A drive axle system comprising:
    a first wheel end assembly and a second wheel end assembly that each have a wheel hub that is rotatable about a wheel axis;
    a support structure that includes:
       a main support that supports the first and second wheel end assemblies; and
       a first rear arm that extends from the main support in a rearward direction;
    an electric motor that is supported by the support structure and is operatively connected to the first and second wheel end assemblies, wherein the electric motor is positioned laterally between the first wheel end assembly and the first rear arm;
    a differential assembly that is operatively connected to the first wheel end assembly, the second wheel end assembly, and the electric motor; and
    a transmission that operatively connects the electric motor to the differential assembly, wherein the transmission is positioned along the rotor axis rearward of the wheel axis.

12. The drive axle system of claim 11 wherein the transmission is laterally positioned between the first wheel end assembly and the first rear arm.

13. The drive axle system of claim 1 wherein the electric motor is positioned laterally between the first wheel end assembly and the first rear arm.

* * * * *